(12) United States Patent
Christopher et al.

(10) Patent No.: US 11,494,807 B2
(45) Date of Patent: Nov. 8, 2022

(54) FORMULATION AND DISPLAY OF PRODUCT REPRESENTATIONS

(71) Applicants: Bowen Christopher, Waterford, VT (US); Keaton Cross, Waterford, VT (US)

(72) Inventors: Bowen Christopher, Waterford, VT (US); Keaton Cross, Waterford, VT (US)

( * ) Notice: Subject to any disclaimer, the term of this patent is extended or adjusted under 35 U.S.C. 154(b) by 0 days.

(21) Appl. No.: 17/247,486

(22) Filed: Dec. 14, 2020

(65) Prior Publication Data

US 2021/0103952 A1  Apr. 8, 2021

Related U.S. Application Data

(63) Continuation of application No. 15/629,047, filed on Jun. 21, 2017, now abandoned.

(60) Provisional application No. 62/426,348, filed on Nov. 25, 2016.

(51) Int. Cl.
*G06Q 30/00* (2012.01)
*G06Q 30/02* (2012.01)
*G06Q 30/06* (2012.01)
*G06F 16/2457* (2019.01)

(52) U.S. Cl.
CPC ... *G06Q 30/0255* (2013.01); *G06F 16/24578* (2019.01); *G06Q 30/0271* (2013.01); *G06Q 30/0631* (2013.01)

(58) Field of Classification Search
CPC .......... G06Q 30/0255; G06Q 30/0271; G06Q 30/0631; G06F 16/24578
See application file for complete search history.

(56) References Cited

U.S. PATENT DOCUMENTS

| | | | |
|---|---|---|---|
| 2008/0255925 A1* | 10/2008 | Vailaya | G06Q 30/0204 705/7.33 |
| 2016/0284007 A1* | 9/2016 | Sakai | G06F 16/24578 |
| 2017/0161618 A1* | 6/2017 | Swaminathan | G06F 16/23 |

OTHER PUBLICATIONS

Pande, Amit, Kai Ni, and Venkataramani Kini. "SWAG: Item recommendations using convolutions on weighted graphs." 2019 IEEE International Conference on Big Data (Big Data). IEEE, 2019.*

* cited by examiner

*Primary Examiner* — Kathleen Palavecino
(74) *Attorney, Agent, or Firm* — STGIP, LLC; Shawn Gordan (57) ABSTRACT

A system and method is provided for generating new product offerings for display in which products are decoupled into components and the components are weighted based on user-specific preferences and market trends. The weighted components are then recompiled into new product offerings based on a probabilistic selection. Each component may be associated with related or otherwise applicable components and these associated components may also be incorporated into a new product offering for display during the probabilistic selection process. The selection and display process may also be tailored to specific users by adjusting weights based on preferences of those specific users.

1 Claim, 7 Drawing Sheets

FORMULATION AND DISPLAY OF PRODUCT REPRESENTATIONS

RELATED APPLICATION DATA

This application is a continuation of U.S. application Ser. No. 15/629,047, filed Jun. 21, 2017, which claims priority to U.S. Provisional Application No. 62/426,348 filed on Nov. 25, 2016.

FIELD OF THE INVENTION

The present invention generally relates to presenting products on displays for user sorting and selection. In particular, the present invention is directed to a system and method for creating and presenting product representations on displays for user sorting and selection based on user input and market trends.

BACKGROUND

There are many programs that allow users to customize products for viewing and/or purchasing. Such programs allow users to, for example, change the color of an item, change the size of an item, add a logo to an existing product offering, or add an image or text to existing product offerings, such as cars, mugs, t-shirts, cards, calendars, cakes, etc. In addition, some programs may allow users to "build" products by making customized selections among various features, e.g., leather or cloth, dark template or light template, pepperoni or anchovies. Further, other programs may use user-specific data or general market trends to make customized product suggestions for users. However, in some industries or fields of endeavor, there is a need for automatically generating new product suggestions based on an algorithmic reconfiguration of design elements associated with products in light of prior user choices and trend analysis.

SUMMARY OF THE DISCLOSURE

A method of generating a set of product offerings for display to a user based on user input and market trends is disclosed including identifying a user, storing a plurality of components, wherein the components each have two weights, the component weights including a user component weight that is associated with the identified user based on input of the identified user on prior displayed product representations and a market component weight that is based on input on prior displayed product representations regardless of user identity, and storing a plurality of component values for each of the plurality of components, wherein the component values each have two weights, the component value weights including a user component value weight that is associated with the identified user and based on input of the identified user on prior displayed product representations and a market component value weight that is based on input on prior displayed product representations regardless of user identity. A set of product representations is displayed for the identified user, wherein each product representation of the set of displayed product representations is compiled from selected components from said plurality of components and selected component values of said selected components. Based on input of the identified user, the user component weight of each component of a displayed product representation from the set of displayed product representations for which the identified user provides input is adjusted, but the user component weight is not adjusted based on inputs not received from the identified user associated with the user component weight. In addition, based on input of the identified user, the user component value weight of the component value of the component of the displayed product representations from the set of displayed product representations for which the identified user provided input is adjusted, but the user component value weight is not adjusted based on inputs not received from the identified user associated with the user component value weight. Similarly, based on input of the identified user, the market component weight of each component of a displayed product representation from the set of displayed product representations for which the identified user provides input is adjusted, and, based on input of the identified user, the market component value weight of the component value of the component of the displayed product from the set of displayed products for which the identified user provided input is adjusted. A second set of product representations is generated by selecting, for each member of the second set of product representations, a product type from a group of possible product types, using a weighted random selection process, wherein each product type has a product type weight and is associated with a group of components required to compile each product type, and by selecting, for each member of the second set of product representations and for each component required to compile the selected product type, a one of the plurality of components within the group of components required to compile the selected product type using a weighted random selection process based on a combination of the user component weight and the market component weight of each of the plurality of components within the group of components required to compile the selected product type, and by selecting, for each member of the second set of product representations and for each of the selected components for each of the selected product types, a component value from the plurality of component values stored for the selected component using a weighted random selection process based on a combination of the user component value weight and the market component value weight of each of the plurality of component values stored for the selected component. Selected components are then used to compile, for each member of the second set of product representations, a displayable product representation based on the selected product type, the selected components and the selected component values, and this second set of generated product representations is displayed to the identified user.

It is another objective of the invention to provide a method of generating product offerings for display that includes identifying a use and storing a plurality of components, wherein the components each have two weights, a user component weight that is associated with the identified user based on input of the identified user on prior displayed product representations and a market component weight that is based on input on prior displayed product representations regardless of user identity. The method also includes displaying a set of product representations for the identified user, wherein each product representation of the set of displayed product representations is compiled from selected components from the plurality of components. Based on input of the identified user, the user component weight of each component of a displayed product representation from the set of displayed product representations for which the identified user provides input is adjusted, although the user component weight is not adjusted based on inputs not received from the identified user associated with the user component weight, and, based on input of the identified user, the market component weight of each component of a displayed product representation from the set of displayed product representations for which the identified user provides input is adjusted. A second set of product representations is generated by selecting, for each member of the second set of product representations and for each constituent element required to compile a product representation for each member of the second set, a one of the plurality of components from the plurality of components using a weighted random selection process based on a combination of the user component weight and the market component weight of each of the plurality of components and compiling, for each member of the second set of product representations, a displayable product representation from the components selected for each member. The second set of product representations is displayed to the identified user.

It is another objective of the present invention to provide a method of generating a set of product offerings to display to a user by identifying a user and displaying a set of product representations to the user, wherein the set of product representations is generated by compiling selected components from a group of possible components, wherein the selected components are selected using a random weighted selection process, wherein each of the possible components has a market weight that is based on inputs aggregated from a plurality of users and received with respect to previously displayed product representations that included as a constituent element a one of the possible components and a user weight that is associated with the user and is based on inputs received from the user with respect to previously displayed product representations that included as a constituent element a one of the possible components, and wherein the random weighted selection process depends on a combination of the market weight and the user weight.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

The present invention is directed toward a method and system for creating product offerings for display based on user selections regarding previously displayed products and based on an analysis of market trends. In this way, users can be presented with product offerings that were not necessarily pre-existing. This allows retailers, wholesalers, and manufacturers to present to potential customers products that are both tailored to a specific user and informed by the latest trends. Critically, the present invention automates the creation and display of new product offerings such that retailers, wholesalers, and manufacturers are able to display these new products in real time without ongoing input from the retailers, wholesalers, and manufacturers themselves. This can provide a substantial advantage in some industries, particularly in those in which styles and trends can come and go quickly, such as fashion.

In an exemplary embodiment, products are associated with a set of interchangeable design elements or components. A product may have any number of interchangeable design elements. In a simplified example, a t-shirt base product may have design elements such as size, color, style, and material. In many instances, a design element or component can be subdivided into more refined elements or components. For example, a t-shirt product's style component could be a general component or it could be broken into a number of separate components, such as fabric pattern, sleeve type, pockets, fastenings, collar, cuff, and cut. For the techniques described herein, either a more generalized component structure or more granular component structure may be used, depending on the circumstances and desired outcome for product generation and display.

For each design element or component, there will be a number of options, or values, such as small, medium, large, or extra-large; yellow, red, purple, blue, or green; V-neck or crew neck; and cotton or polyester. A database of the possible interchangeable product design elements (components) and the possible options (values) for each of those design elements is maintained (and updated as desired, such as by adding new colors or removing certain styles). These elements are interchangeable because they can be used, directly or indirectly, in other base product types. For example, a "shorts" base product could be compiled using many of the design elements associated with a "t-shirt" base product, such as size, color, or material. Some design elements, such as style in this example, could be made interchangeable based on an intermediary association. For example, a V-neck value for a t-shirt style component could be associated with a "long" value for a style component of a shorts base product. In that example, if a V-neck value is selected during the formulation stage (as described below) as a component for a shorts product to be assembled, the "V-neck" value can be converted to a "long" value, which would then be used in the formulation of the shorts product representation.

In this way the catalog of base products or templates could include any kinds or types of products, whether or not in related fields. However, in a preferred embodiment, the base products to which the decoupling and recompilation process are applied will reside in somewhat related fields, such as, for example, articles of clothing; types of jewelry, such as an earring, necklace, brooch; or modes of transportation, such as cars, bikes, scooters, and trucks. In the present invention, the base products are not necessarily stored as completed products with particular characteristics, but rather as a template that includes a plurality of design elements or components. The components, once determined via a selection process described below, can be compiled to generate a completed product representation for display. In this way, a very large number of varieties of products can potentially be constructed without the cumbersome need to initialize and store each possible variety.

Because the product representations can be decoupled into components and component values, data related to user actions and market trends can be used, counterintuitively, in a less direct manner and more granular manner that can potentially glean or at least make educated guesses at future trends. This may be accomplished by applying user and market data to the constituent components of product representations. For example, component values, as well as components and even base product types of categories, can be given various weights related to a number of factors, including factors related to specific users, general trends, how generalizable a particular component is to all base products, and how compatible a particular component is with a specific base product or a group of base products, in order to rank or track the components with respect to each other. Thus, weights for component values may be incremented up or down depending on what is happening to displayed product representations that include those component values. For example, if lots of products that include a blue component value are being viewed and purchased, the blue component will receive increased weight. Similarly, if products that include a red component value are being shunned by users, the red component value will be given a lower weight.

It should be noted that there are two levels of this weighting system. In one, weights are determined by market trends, i.e., the inputs or actions of all users of the system are aggregated and a weight for each component is set based on that data. This level can be referred to as market level weighting. In the other, a separate set of weighting values is maintained for each component value for each user of the system, i.e., the inputs or actions of individual users are used to create weights for components for that specific user only. This level can be referred to as user level weighting.

Using the user level weighting and market level weighting, component values (as well as, optionally, components and base product types) are selected and recompiled to create new product offerings for display. The base products for the new product offerings can be the same as, similar to, or very different from the base product of the product offerings that had been previously displayed and that the selected components were decoupled from, and can also be different than the base products that the user-specific input and the market trends data are based on. An initial step in the formulation stage, then, is to select a base product or preferably a set of base products to generate and display. This can be done by using the same base product a user is currently viewing or has recently viewed, or base products that are related to or associated with such a base product, or some other selection process (including a selection process described herein). In a preferred embodiment, a variety of base product types will be used so that a variety of product types will be generated for display. Once a base product type is selected for display, the components required to compile or assemble that product type will be known based on stored templates. Then component values for each of those required components must be selected. The component values selection process is based on the weights each component value has. The higher the weight a component value has, the more likely it is to be selected. Once selected, a component value will become part of a generated product representation along with the other selected component values for the other required components for the selected product type.

More detail on the selection process applied to the selection of component values (and optionally to components and product types as well) will be provided below. However, it should be noted that the component value selection process can be based on market level weights, user level weights, or, preferably, a combination of market level weights and user level weights. A selection process that uses a combination of market level and user level weights can be accomplished by applying a weighting system that combines the weights into a single weight for each component value. For example, the market weights and user weights could be given equal weight. Or user weights could be given more weight, such as double. In addition, this weighting of weights can be varied based on particular users, particular fields (e.g., clothing or jewelry), or even particular times of the year, where in some cases user weight is given more weight and in other cases market weight is given more weight.

The new product generation process can also be modified for a specific user by, as new products are to be generated for a specific user, altering the weighting process entirely for certain components as they relate to particular users. For example, if a user never purchases a product that costs more than a certain amount or only buys clothing and never jewelry, those components can be given overriding weight in the product generation process.

During the formulation stage, the new set of product representations generated for display are compiled based in part on the weights of each of the decoupled components and component values. The new product representations for display are not necessarily generated simply by pulling the highest weighted components for each component needed for a product type and assembling them into a new product for display, although that is one way of generating new product representations. Preferably, a randomness factor is incorporated into the new product generation algorithm such that component values are selected through a lottery type or probabilistic selection process instead of absolutely. In other words, if for a color component of a t-shirt, for example, there are five possible colors with different weights, say red has a weight of 12, green 9, blue 5, yellow 3 and purple 1, then instead of always selecting red for the color component, the process would select a color for each product representation to be generated randomly from the weighted proportions via a weighted random selection technique. For the above color example, in one weighted random selection technique, red would have a 40% chance of being selected, yellow would have a 10% chance of being selected, and so forth, for each time the color component has to be selected to compile a new product offering. (It will be noted that for any given generation of a set of product representations for display, the selection technique could preserve the component value ratios throughout the selection process or not preserve the ratios based on prior selections in the process. For example, once the red component value is selected as the component value for one product, the red proportion could be decreased for the selection of the color component for the next product to be generated, or, for a greater increase in variations, the red color component could be eliminated as a possible value to be selected after it has already been selected.) Applying these techniques to the selection of each component required to generate a product type, many variations will be generated and displayed. It will be understood that many different weighted random selection techniques could be applied, with different techniques applied to different components, with some techniques being more conservative (meaning that the technique is more likely to select the most heavily weight option) or more sprawling (meaning that the technique skews away from the most heavily weighted option toward other options).

The component selection and product generation process is continued until enough product representations are generated for display, a number that can vary depending on factors such as user preferences and settings. Once the pre-determined number of product representations has been generated for display, that set of product representations is displayed to a user, and as many such sets are generated and displayed to users as there are users and as many times as each user refreshes the display or otherwise takes an action associated with generating a different set of product representations to display. These sets of displayed product representations will then be acted on by users, and these actions may include views, adding to wish lists, purchases, ratings, likes or dislikes. Based on such input, some of the product representations generated and displayed will be more popular with users and some will be less popular with users. These user preferences will then be fed back into the system in the form of adjusted weights for the values of the decoupled components associated with those product representations, and those iteratively adjusted weights will be used to continuously generate new product representations for display.

Through this continuing process the product creation system is able to not only incorporate user preferences to automatically generate potentially popular products but also introduce new variations that may not only track trends but anticipate or even start new ones due to the incorporation of variations and randomness factors. Moreover, such new trends will necessarily be fed back into the weighting of the components and then incorporated in the formulation of product representations and so on. In this manner, the present invention can mimic, in a sense, the more traditional way that designers have looked at markets and trends for information while also relying on their own intuitions to design their next collections. This allows that process to be performed at least partially automatically and thus much faster, and more tailored to individual consumers (via the user level weighting portion).

In another exemplary embodiment, the weighting and selecting of components can be expanded to associated component values with similar or related (or opposite) component values. For example, if a user has shown through inputs such as purchases a propensity for the color red, it would be overly simplistic to consistently generate product offerings that include only one shade of red. Instead, components values can lead not only to other color component values via the weighted random selection technique described above but also to the generation of other component values by association. For example, the color component red may be associated with related, similar, complementary, or opposite colors, such as any number of other shades of red, pink, burgundy, blue or green. These associated component values could be selected during the component selection process along with, or as a substitute for, the primary component they are associated with. The selection of secondary, or associated, component values may be accomplished by replacing the weighted proportion of a primary component with a new set of proportions for the associated component values that will be part of the weighted random selection process. In another alternative, the primary component's proportion could be split so as to maintain a strong possibility of being selected but also allow for the chance that an associated component value will be selected. For example, if in the product generation process described above, the color component red was rated such that red would have a 40% chance of being the selected component value, this could be used not to just select red as the component 40% of the time, but instead to select the particular shade of red of that component value only 20% of the time, and replace the remaining 20% with associated component values (e.g., 4% dark red, 4% pink, 4% burgundy, 4% burnt orange, and 4% blue, although it will be noted that the associated component values could have any proportions among themselves). This secondary decoupling and reformulation process can be preferably applied to blended market/user weighted selections, which are described in more detail below. It will further be understood that the secondary decoupling and reformulation process may be applicable to most components as well as product types, and as such can result in a very large number of possible combinations, even in systems with relatively few products types, components, and component values. By way of example, if the highest weighted components at a given time for a given user would most likely lead to the generation and display of a red cotton t-shirt, an associated components/associated component values selection process could lead to the generation and display of pink wool socks.

The component and component value associations may be adjusted, either manually by administrators of the system or automatically based on user input (individual or market). That is, any association may be strengthened, weakened, started, or eliminated. For example, if product representations displayed having a pink component value that was selected through the pink component value's association with the red component value are never purchased, then the pink component value's association with the red component value may be diminished or severed. Market trend data can be entered into the system manually by administrators of the system or can be derived from external monitoring of proprietary or publicly available data. In addition, or in the alternative, market trends can be determined from monitoring user actions on the system. For example, market level weights may be adjusted by giving increased weight to component values based on the aggregate inputs of all users. Or an administrator could increase the weight of certain component values based on external information. In a simplified example, if the color blue is determined to be trending based on external information, then all component values that are associated with blue are given additional weight. (It will be understood that a market trend could be for a particular shade of blue and the system is scalable to become more granular, and further that one component value such as color may be trending in only a subset of product types (or geographic areas) and the system is also capable of becoming more granular by adding more sub-components with values. For example, a trend may show that blue is trending on clothing in the southwest, and thus blue values would be given more weight for components associated with clothing in the southwest instead of all blue component values.) It may also be noted that market level weights derived from aggregate user inputs may be divided into any number of submarkets based on shared characteristics of a subset of users, such as demographics. By giving a component value more weight, what is meant is that that component value will be more likely to be selected for a base product that is being compiled for display as described above.

In order to simultaneously tailor the weighting algorithm to market trends and user-specific preferences, the system must also link the compilation process to user-specific data. Thus, input must be associated with a given user for purposes of adjusting user level weights. This requires that each user (or at least each user for which user-specific preferences can be used to influence the recompilation and display algorithms) must be associated with an account or otherwise be tracked. For an account, the user's inputs are stored and compiled in order to weight component values at the user level. For example, user A may have viewed and purchased cotton t-shirts several times recently. In such an example, the base product t-shirt and the component value cotton would be given added weight for that user at the user level. (That individual user's actions would also be included, along with all other user's actions, as data points for market level weighting.)

In operation then, based on the simplified, illustrative above examples, if user A logs onto the system, new product offerings may be compiled and displayed based on both market trends and user preferences associated with user A. As such, since in a preferred embodiment a number of product representations will be displayed, the weighting system would make it more likely that the compilation process will select the t-shirt base product as well as a cotton component value (based on user A's preferences) and a blue component value (based on market trends) to display. Thus, user A will likely see a blue cotton t-shirt as one of the product offerings displayed.

In another aspect of the present invention, a user preference could be price range. If this is a strong preference, meaning that a particular user never looks at or purchases any item not in a specific price range, that component value could be given extra added weight or even overriding status so that only representations of products that fall within the preferred price range are displayed.

In another aspect of the present invention, the location a product representation is displayed on a page can be tailored to specific users. If a user tends to view and purchase products that had product representations displayed in a particular area on the display, such as upper right, product representations for products an administrator wishes to promote can be displayed in that area.

By way of another simplified, illustrative example, there are two base product templates, one for an earring and one for a necklace. The earring template may include components for material, color, shape, image, alphanumeric characters, design, texture, and the like. These components are specific for earrings, but particular component values that can be used for the components may be applicable to components that can be used for other product templates. Or those values may be convertible to related values that are applicable to components for other product templates. Thus, an earring having a "skull-and-crossbones" value for its shape component may translate into a "skull-and-crossbones" value that can be incorporated into similar shape component for a necklace template.

If a user is shown a display and takes an action on a skull-and-crossbones earring image, values for interchangeable components associated with the skull-and-crossbones earring product will be impacted. Based on the user's actions, such as view, purchase, or discard, for example, the values associated with the skull-and-crossbones earring are given more or less weight for later use in recompilation stages. This adjustment is made in both weights specifically associated with that user and weights for market trends. In the former, the adjustment will have more impact on the recompilation process for that particular user, while in the latter the adjustment will be just one of many data points that go into determining overall market trends.

Starting with an initial set of conditions and parameters, which may be default or based on prior data related to customer choices and purchases, each interchangeable product design component is given a weight. Then, more user data relating to interchangeable product design values associated with displayed product representations selected by a user are entered into the system. The weights of these values are adjusted by user actions. A market weight is adjusted for a component associated with a product representation that was acted on, and that market weight may be used in the selection process of component values for the generation of product representations for all users. A user weight is adjusted for a component associated with a product representation that was acted on, and that user weight will only be used in the selection process of component values for the generation of product representations for the user associated with that user weight.

The component values and/or product types and/or components determined to be trending and/or important for a particular user and/or important for a particular product type are likely to be selected and then incorporated into product type templates. The product type templates that are used in the formulation stage may also be selected based on trend analysis and user actions.

Once the product type templates are determined, the interchangeable product design components and component values are selected and used to create new product representations for display. By way of simplified example, the algorithm of the present invention may be likely to generate, based on a user's purchase of skull-and-crossbones earrings and market trends favoring the incorporation of purple into necklaces, a product representation for a necklace with a primary color of purple and a skull-and-crossbones motif to display to that user among the set of product representations displayed to that user.

In this way, product types and/or component values are selected based on a trend analysis of decoupled interchangeable product design elements of products that are viewed or purchased by a user or previous customers and recompiling the selected interchangeable product design elements to create new products for display or purchase that include product design elements and/or product types that were not specifically selected by or associated directly with the user for whom the new products are displayed.

In operation, any number of starter product representations can be generated or incorporated into the system to serve as a starting set. For each such product representation, a database will include associated decoupled components and component values. Each component value may start with a null or other default weight (or the system can be manually loaded with higher weights for certain components and/or component values based on administrator experience or other available data). Then new users are provided with a display of the starter product representations and given options to view, add to wish list, or purchase, although it will be understood that other possibilities can be incorporated, such as rating systems and whether a product was shared, etc., and based on those user responses or inputs the weights associated with each product type, each component, and each value of the component of the acted on product representation are adjusted in accordance with a suitable weighting scheme. For example, a view will result in a small increase in the weight for each component and component value associated with the viewed product representation; a product representation that is added to a wish list will result in a medium increase in the weight for each component and component value associated with the wish listed product; and a product that is purchased will result in a large increase in the weight for each component and component value associated with the product representation of the purchased product.

Figure 1:
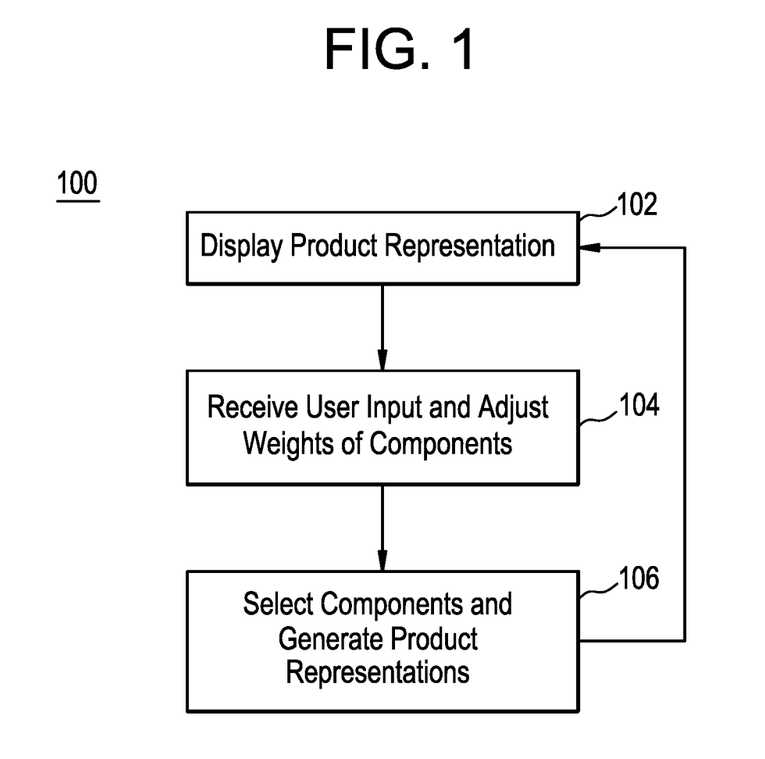
FIG. 1 is a flowchart outlining an embodiment of the present invention.

There are essentially three stages that, in conjunction, allow for the formulation and display of user-specific product offerings based on both user-specific input and trend analysis. The stages are iterative and are summarized in FIG. 1, which outlines an exemplary embodiment for a process 100 for formulating and displaying product representations based on both user-specific data and market trend data. At step 102, product representations are displayed to a user, where the user has been identified and the initial display of product representations is generated via the weighting, selection and formulation processes described above and below, or, for a user who has no history in the system, a default set of product representations based on, e.g., market trends alone. At step 104, weights for decoupled elements, element values, and/or product types or categories are adjusted based on received user input. At step 106, a new set of product representations are formulated based on a random selection of the weighted elements, element values, and/or product types, and those product representations are then displayed to the user, replacing the initial set of product representations. Process 100 can continue for each user as each user makes selections or otherwise indicates that another set of product representations should be displayed. (It is noted that users may provide other inputs, such as choosing certain characteristics that should be shared by any displayed product representations, that can override parts of the selection process used to generate product representations.)

Figure 2:
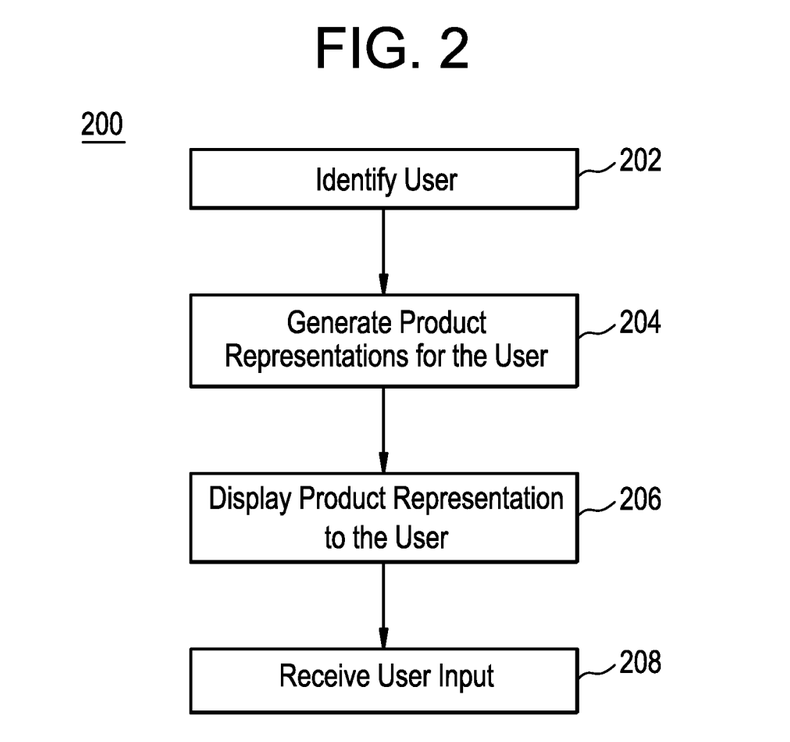
FIG. 2 is a flowchart outlining an aspect of an embodiment of the present invention.

In the displaying stage 200, an exemplary technique for which is summarized in FIG. 2, a user of the system is identified at step 202. Based on the user's identification, at step 204 a product representation or preferably a set or group of product representations is generated and displayed for that user at step 206. Then, the user may make choices or omissions, or rate one or more of the product representations, and this user input is received by the system at step 208. This user input may also include additional parameters, such as the selection of certain characteristics, such as price range, color, or product type, that the user wishes to have displayed. All user input is imported and recorded, both in the aggregate for all users and separately in association for each identified user.

The inputs received from users' actions with regard to product representations are initially associated with the product representations on which those actions were performed. However, in a weighting stage 300, an exemplary technique for which is summarized in FIG. 3, product representations are decoupled into their constituent interchangeable elements or components so that user actions can be associated with those components of the product representations on which the user action occurred. At step 302, user input is imported, and the user input is associated with a specific user. At step 304, product representations for which user input was received and imported are decoupled into their constituent components and the user input is associated with those components (with respect to a specific user). Then, at steps 306 and 308, weights associated with those constituent components for which user input was received are updated or adjusted as applicable by any suitable weighting scheme. For example, a purchase of a product representation may result in the weight associated with each component of that product representation being incremented up by one. In step 306, the market weights of components are adjusted based on inputs received from all users without regard to the identification of the user. In step 308, the user weights of components are adjusted based only on inputs received from a user that is associated with those user weights. In other words, separate user weights are maintained and adjusted for each specific user of the system.

Figure 3:
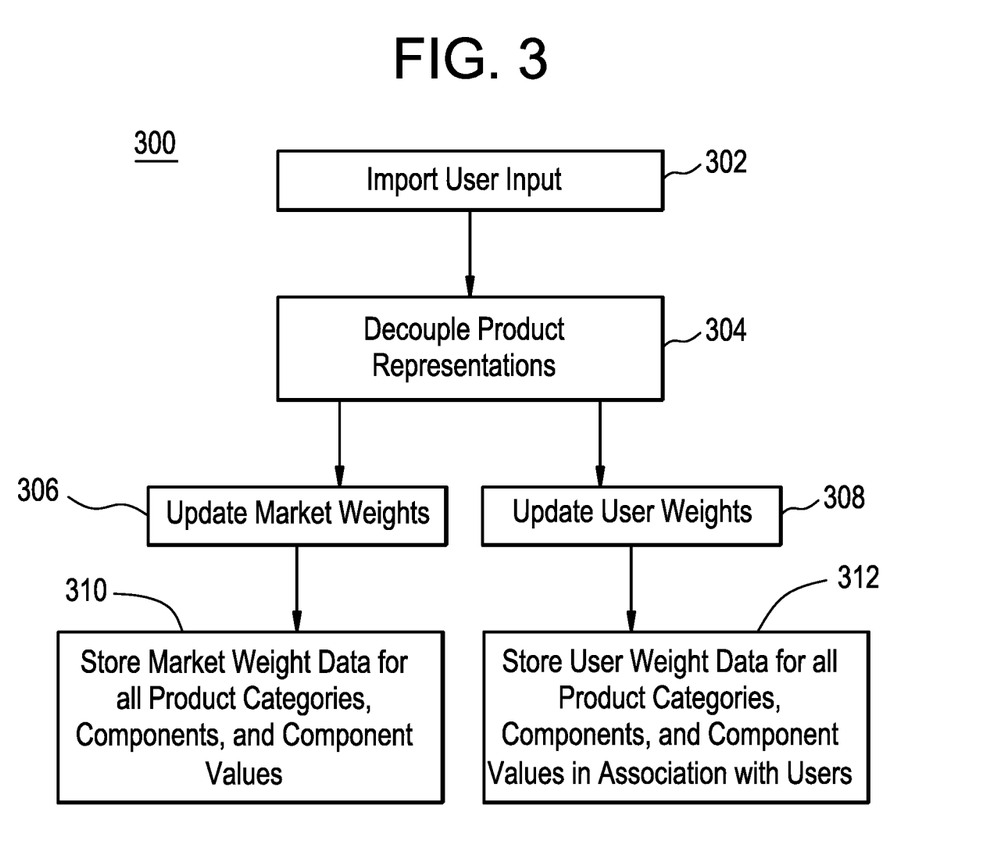
FIG. 3 is a flowchart outlining another aspect of an embodiment of the present invention.

At steps 310 and 312, the market weights of components and the user weights of components are respectively stored.

Figure 4:
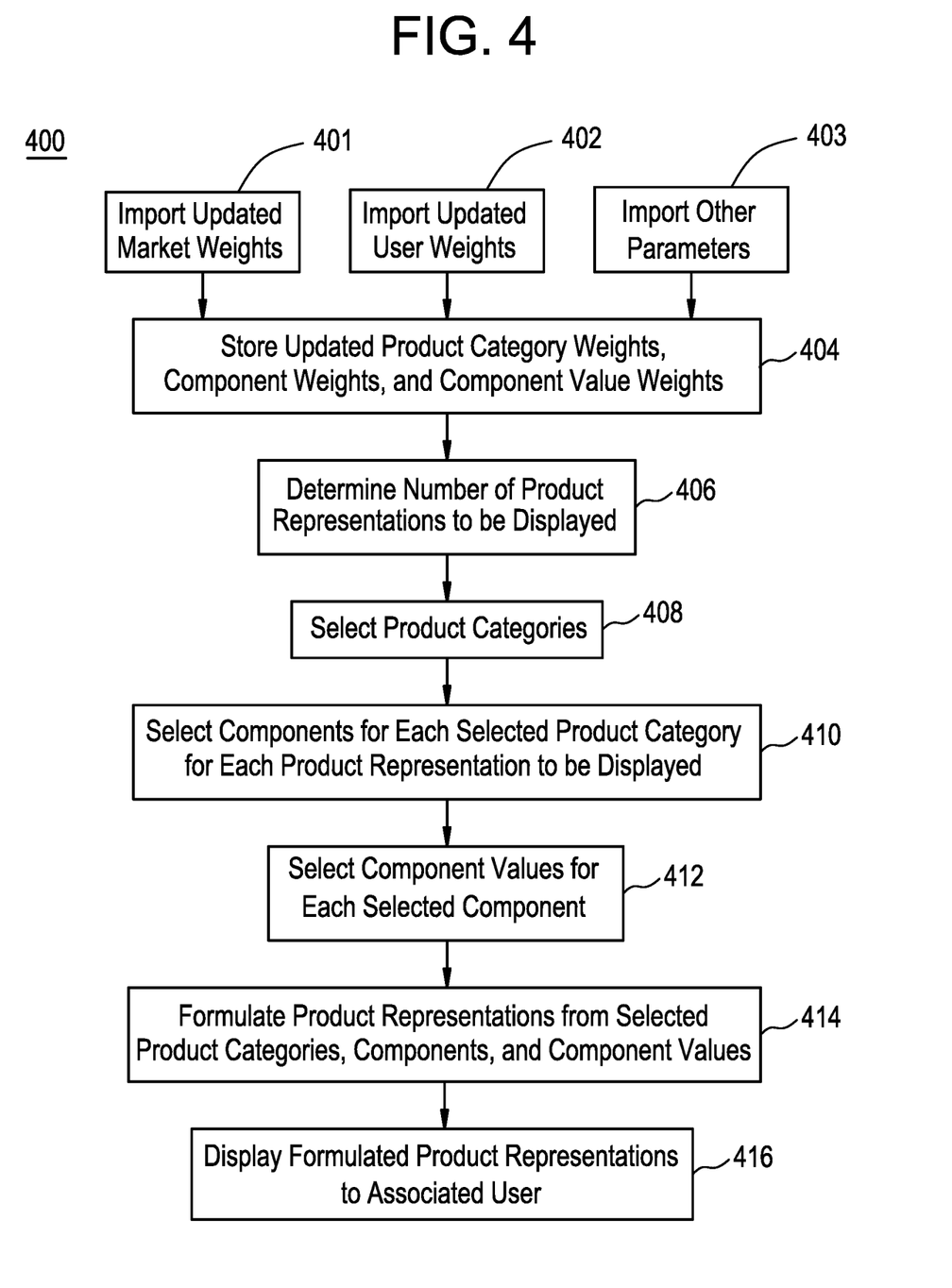
FIG. 4 is a flowchart outlining another aspect of an embodiment of the present invention.

In a formulation stage 400, an exemplary technique for which is summarized in FIG. 4, a new product representation or preferably a new set or group of production representations is compiled by selecting interchangeable components based on market weights and user weights of the components, as well as, optionally, other parameters such as administrator inputs or specific user requests. At steps 401, 402, and 403, the updated market weights, updated user weights, and any other parameters are respectively imported and then stored at step 404 for product types or categories, components, and/or component values. At step 406, the number of product representations to be displayed (and therefore formulated) is determined based on any suitable parameters, including, for example, user preferences. At step 408, if necessary, the categories for the product representations to be displayed are selected for each product representation to be displayed (e.g., twenty). The selection of product categories, if not pre-determined, may be accomplished in an exemplary embodiment by using a weighted random selection technique based on a combination of the market weights and user weights for each possible product category. Components appropriate for each selected or pre-determined product category are selected at step 410. Some or all of the product categories may be the same, but component selection will occur for each product representation to be displayed regardless. The selection of components may be accomplished in an exemplary embodiment by using a weighted random selection technique based on a combination of the market weights and user weights for each possible component for each product category to be formulated. Then at step 412, component values are selected for each component selected in step 410. The selection of component values may be accomplished in an exemplary embodiment by using a weighted random selection technique based on a combination of the market weights and user weights for each possible component value for each component selected for each product category to be formulated for display. At step 414, the components and component values that were selected for each product category are used to generate a product representation for each product representation to be displayed and the formulated product representation is displayed at step 416 to the user associated with the user weights used in the selection process that generated the product representations. It will be noted that formulation stage 400 may be condensed if desired such that, for example, the product categories and components to be used are predetermined and only the component values are selected based on a combination of market weights and user weights.

Figure 4A:
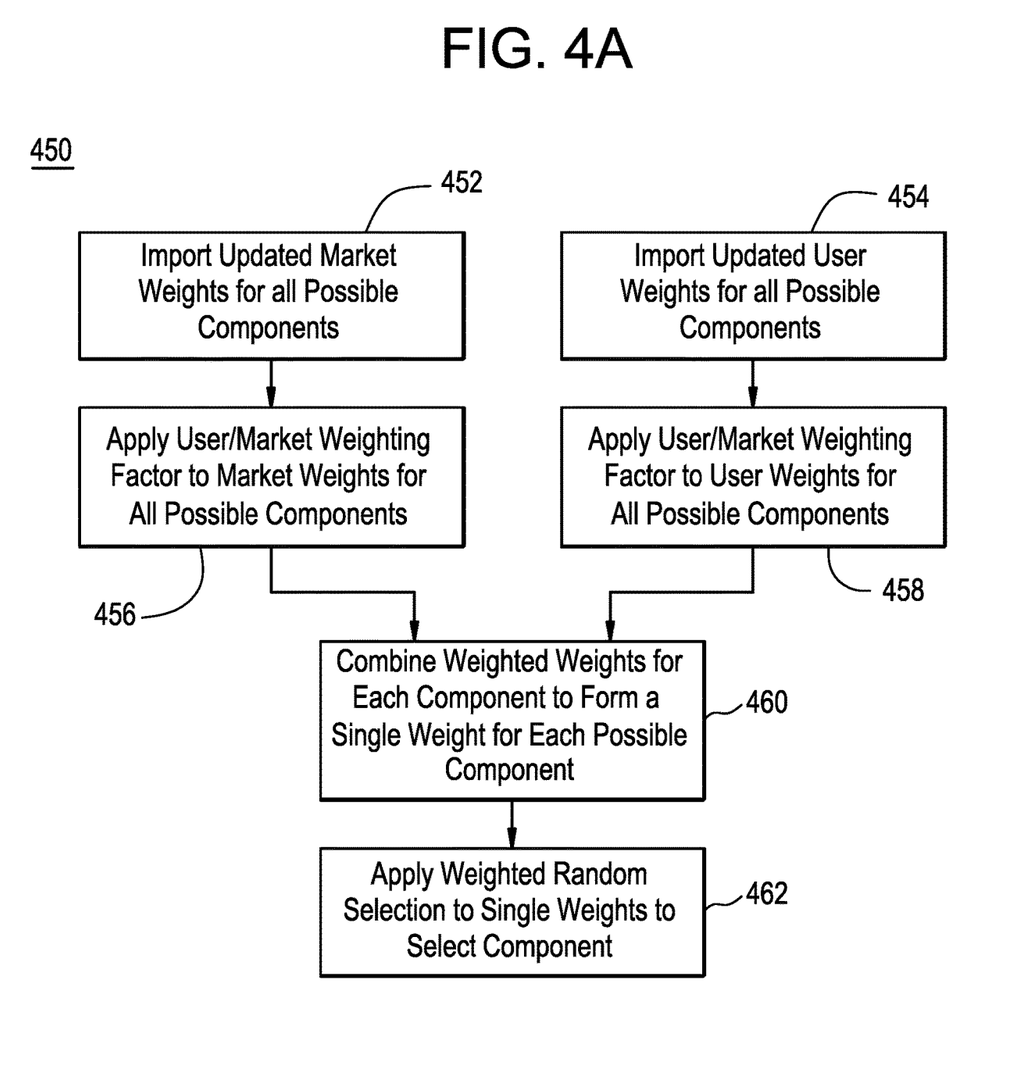
FIG. 4A is a flowchart outlining another aspect of an embodiment of the present invention.

FIG. 4A provides an overview of an exemplary technique 450 for combining market weights and user weights during the selection of, e.g., component values. At step 452, market weights are imported for all possible component values and, at step 454, user weights are imported for all possible component values. At step 456, a user/market weighting factor is applied to each market weight for each possible component value and, at step 458, a user/market weighting factor is applied to each user weight for each possible component value. Then the weighted market weights for each possible component value and the weighted user weights for each possible component value are combined to form a single weight for each of the possible component values (e.g., by adding the weighted weights) at step 460. These single weights can then form the basis of a weighted random selection of component values for all required component values for product representations to be formulated for a given user at step 462.

Figure 6:
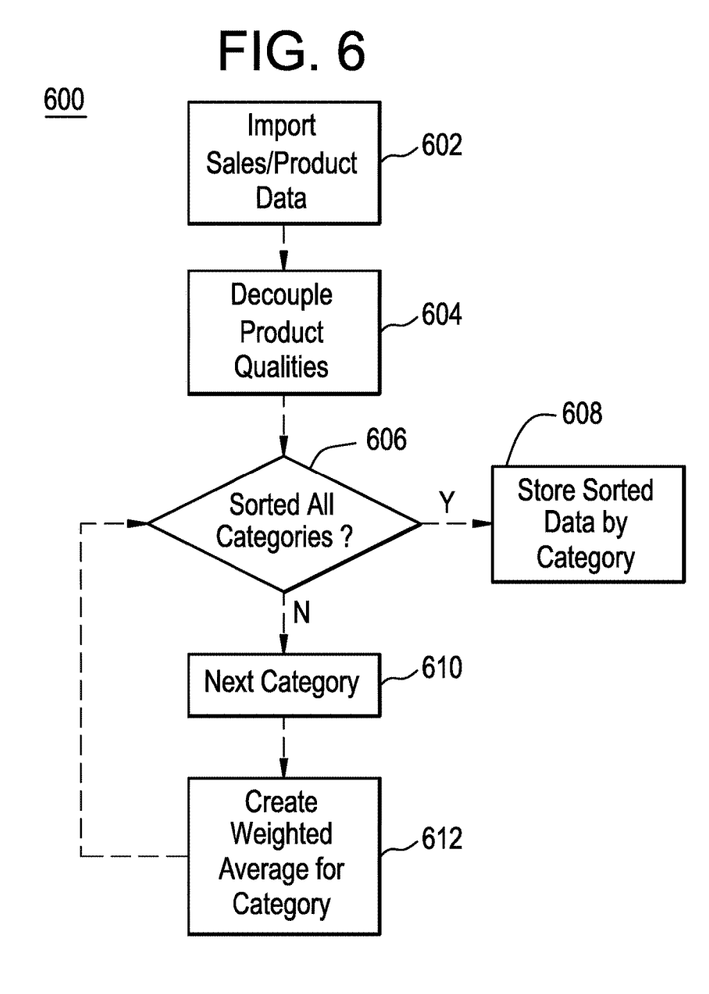
FIG. 6 is a flowchart outlining another aspect of an embodiment of the present invention.

Turning to FIG. 6, an exemplary decoupling technique 600 for decoupling product qualities and updating weights is shown. At step 602, received user input and other product data, such as sales information, is imported. Product qualities for the impacted product representations are then decoupled into constituent components or categories at step 604. Decision point 606 determines whether all components or categories of the decoupled product qualities have been sorted. If not, the next category of the product qualities is handled at step 610 and a weighted average is created for that category at step 612. If it is determined that all categories have been sorted at decision point 606, then data sorted by category is stored at step 608.

Figure 7:
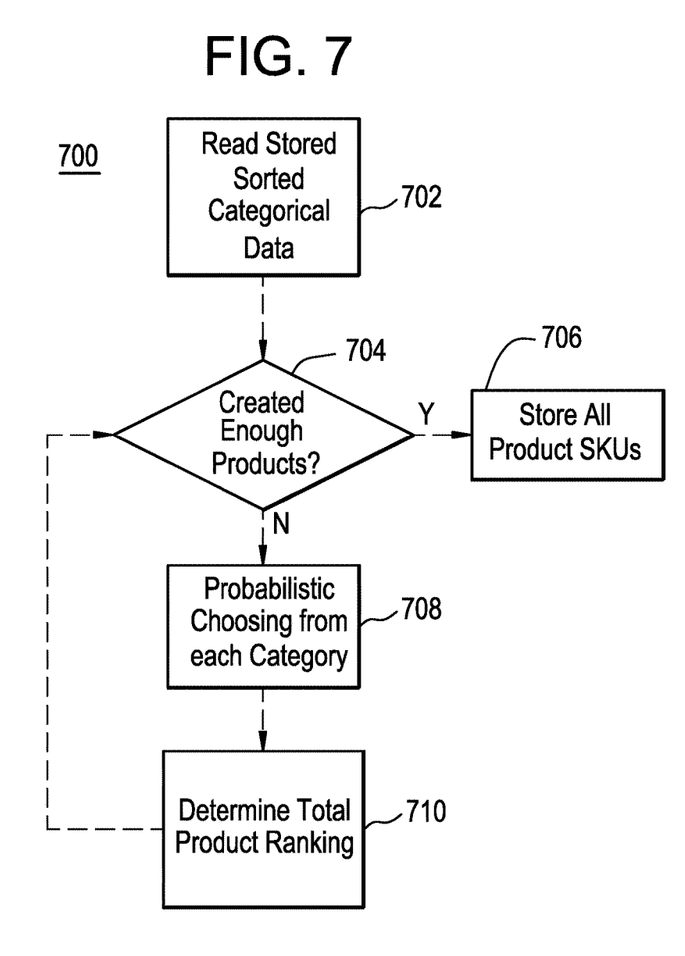
FIG. 7 is a flowchart outlining another aspect of an embodiment of the present invention.

Turning to FIG. 7, an exemplary formulation technique 700 for formulating product representations for display is shown. At step 702, data sorted by category that was compiled and stored in decoupling technique 600 is read. Decision point 704 determines whether enough product representations have been created for displaying to a user. If not, necessary components or interchangeable elements are selected using a probabilistic selection process at step 708 and the ranking of the formulated product representation is determined at step 710. If enough product representations have been created, then all the product SKUs are stored at step 706.

Figure 5:
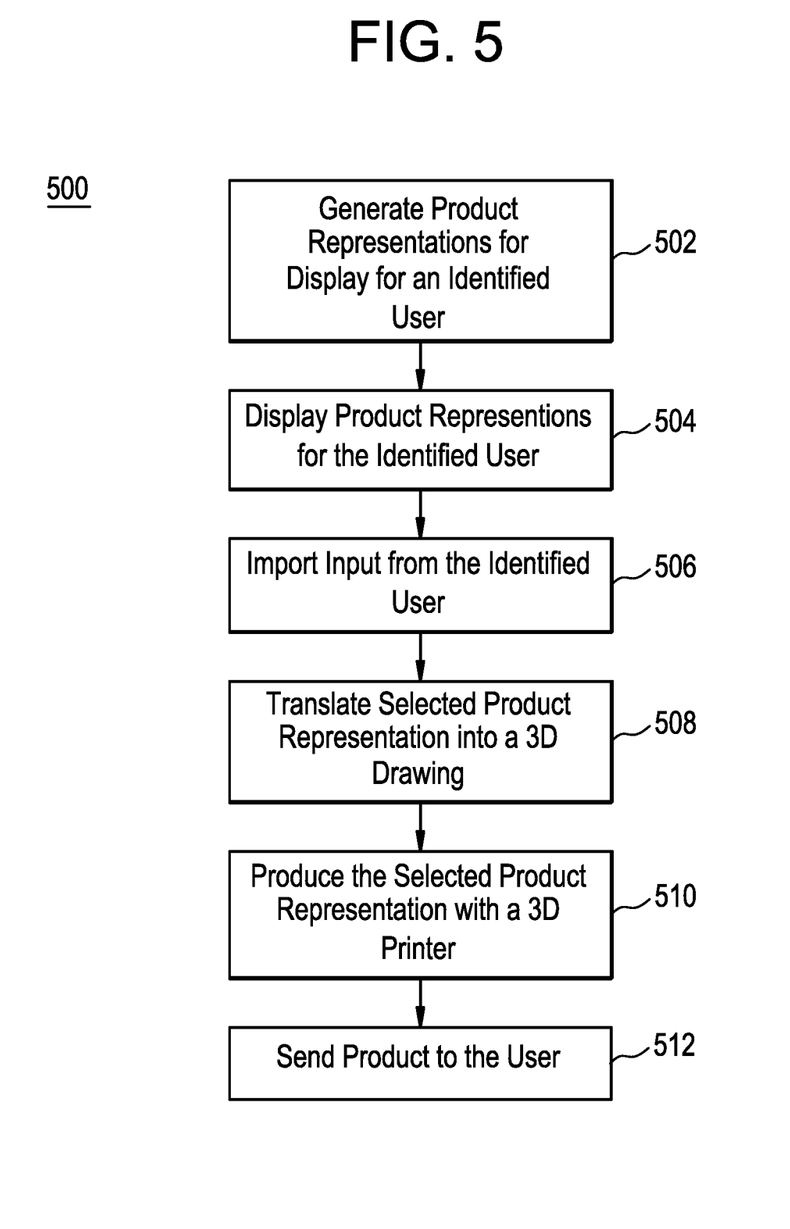
FIG. 5 is a flowchart outlining another embodiment of the present invention.

In another embodiment, which is summarized in FIG. 5, product representations that have been generated for display in the above described manner may be produced automatically by, for example, a 3D printing system. If a displayed product representation is selected for purchase by a user, for example, that selected product representation can be translated into a 3D drawing, which can then be sent to a 3D printer to create a product that can be sent to or picked up by the user. In a production of generated product representations process 500, at step 502 product representations are formulated in accordance with the above described techniques of the present invention. These product representations are displayed to a user at step 504 and after a user performs actions on the displayed product representations, this user input is imported at step 506. At step 508, a product representation that was chosen for purchase by the user is translated into a 3D drawing. The 3D drawing is used to produce a product with a 3D printer at step 510, and the product is sent to the user at step 512.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of generating product offerings for display to a user, comprising:
   identifying the user; and
   displaying a set of newly generated product representations to the user, wherein each of the product representations from the set of newly generated product representations is generated by compiling components that are selected from a group of possible components, wherein the components for each of the newly generated product representations are selected using a random weighted selection process, wherein each of the possible components has a market weight that is based on inputs aggregated from a plurality of users and received with respect to a plurality of previously displayed product representations that included at least one of the possible components as a constituent element of at least one of the plurality of previously displayed product representations and a user weight that is associated with the user and is based on inputs received from the user with respect to at least one of the plurality of previously displayed product representations that included at least one of the possible components as a constituent element of at least one of the previously displayed product representations, and wherein the random weighted selection process depends on weights for each of the possible components that are a combination of the market weight and the user weight of each of the respective possible components.

\* \* \* \* \*